US012662318B2

(12) United States Patent     (10) Patent No.:   US 12,662,318 B2

Suchý     (45) Date of Patent:   Jun. 23, 2026

---

(54) GUARD ASSEMBLY FOR A CONVEYOR SYSTEM

(71) Applicant: Intelligrated Headquarters, LLC, Mason, OH (US)

(72) Inventor: Jan Suchý, Zlín (CZ)

(73) Assignee: Intelligrated Headquarters, LLC, Mason, OH (US)

( * ) Notice: Subject to any disclaimer, the term of this patent is extended or adjusted under 35 U.S.C. 154(b) by 118 days.

(21) Appl. No.: 18/591,511

(22) Filed: Feb. 29, 2024

(65) Prior Publication Data

US 2025/0276852 A1     Sep. 4, 2025

(51) Int. Cl.
    *B65G 47/66*     (2006.01)
    *B65G 13/11*     (2006.01)

(52) U.S. Cl.
    CPC .......... *B65G 13/11* (2013.01); *B65G 2207/40* (2013.01); *B65G 2207/48* (2013.01)

(58) Field of Classification Search
    CPC ...................................................... B65G 47/66
    USPC ................................................ 198/539, 599
    See application file for complete search history.

(56) References Cited

U.S. PATENT DOCUMENTS

| | | | |
|---|---|---|---|
| 2,624,444 A | 1/1953 | Casabona | |
| 5,971,129 A * | 10/1999 | Stawniak ................ | B66B 29/08 |
| | | | 198/324 |
| 7,284,658 B2 | 10/2007 | Wiggins et al. | |
| 7,882,944 B1 | 2/2011 | Eubanks et al. | |

| | | | |
|---|---|---|---|
| 8,365,899 B2 * | 2/2013 | McKee ................. | B65G 47/66 |
| | | | 198/600 |
| 9,027,738 B2 | 5/2015 | Coen et al. | |
| 9,452,896 B2 | 9/2016 | Lee | |
| 9,663,306 B2 * | 5/2017 | Pettinga ................ | B65G 47/66 |
| 9,758,317 B2 | 9/2017 | Sammauro | |
| 10,556,755 B2 * | 2/2020 | Pettinga ................ | B65G 47/66 |
| 10,807,809 B1 * | 10/2020 | Deboer ................. | B65G 47/66 |
| 11,597,604 B1 | 3/2023 | Simon | |

(Continued)

FOREIGN PATENT DOCUMENTS

| | | |
|---|---|---|
| CA | 2755249 A1 | 9/2010 |
| CN | 110691744 A | 1/2020 |

(Continued)

OTHER PUBLICATIONS

U.S. Non-Provisional Utility Patent Application for "Guard Apparatus For A Conveyor System", unpublished (Filed Feb. 29, 2024), Jan Suchý (Inventor), Intelligrated Headquarters, LLC (Applicant), U.S. Appl. No. 18/591,544.

(Continued)

*Primary Examiner* — Douglas A Hess

(74) *Attorney, Agent, or Firm* — Alston & Bird LLP

(57)       ABSTRACT

Various embodiments are directed to a guard assembly for a conveyor system. The conveyor system comprises a plurality of rollers rotatably disposed between a pair of side frames of the conveyor system. The guard assembly comprises a top cover and a holder such that the top cover is disposed in a gap between two adjacent rollers of the plurality of rollers of the conveyor system; the holder is detachably coupled to the top cover; the holder is configured to secure the top cover between the two adjacent rollers of the conveyor system and the top cover defines a plurality of friction-reducing features proximal to at least one roller of the conveyor system.

12 Claims, 10 Drawing Sheets

(56) References Cited

U.S. PATENT DOCUMENTS

| | | | | |
|---|---|---|---|---|
| 11,629,010 B1 * | 4/2023 | DeFant | .................. | B65G 13/07 |
| | | | | 198/790 |
| 11,661,283 B2 * | 5/2023 | Pettinga | ................. | B65G 39/12 |
| | | | | 193/35 R |
| 12,286,302 B2 * | 4/2025 | Pettinga | ................. | B65G 13/07 |
| 12,365,549 B2 * | 7/2025 | Drummond | ........... | B65G 47/66 |
| 12,378,083 B2 * | 8/2025 | Pettinga | ................. | B65G 47/66 |
| 2010/0108467 A1 * | 5/2010 | Barreyre et al. | | |
| 2010/0230247 A1 | 9/2010 | Mckee | | |
| 2011/0132725 A1 | 6/2011 | Marshall et al. | | |
| 2012/0227232 A1 | 9/2012 | Jabber et al. | | |
| 2019/0002210 A1 | 1/2019 | Hekman et al. | | |
| 2021/0179365 A1 | 6/2021 | Pettinga | | |
| 2022/0169454 A1 | 6/2022 | Schroader | | |
| 2023/0098268 A1 | 3/2023 | Pettinga | | |
| 2023/0278808 A1 | 9/2023 | Pettinga | | |
| 2023/0312269 A1 | 10/2023 | Guruswamy et al. | | |
| 2023/0365346 A1 | 11/2023 | Dietrick, III | | |
| 2024/0034570 A1 | 2/2024 | Berenbach et al. | | |
| 2025/0276854 A1 | 9/2025 | Suchý | | |
| 2025/0276855 A1 | 9/2025 | Suchý | | |

FOREIGN PATENT DOCUMENTS

| | | | |
|---|---|---|---|
| DE | 1602097 A1 | 4/1970 | |
| DE | 19858521 A1 | 6/2000 | |
| DE | 102019101473 A1 | 7/2020 | |
| EP | 2455307 A1 | 5/2012 | |
| EP | 3699113 A1 | 8/2020 | |
| KR | 10-2022-0124440 A | 9/2022 | |
| WO | 2020/136799 A1 | 7/2020 | |
| WO | 2025/024451 A1 | 1/2025 | |

OTHER PUBLICATIONS

U.S. Non-Provisional Utility Patent Application for "Guard Assembly For A Conveyor System", unpublished (Filed Feb. 29, 2024), Jan Suchý (Inventor), Intelligrated Headquarters, LLC (Applicant), U.S. Appl. No. 18/591,532.

Extended European Search Report Mailed on Jul. 8, 2025 for EP Application No. 25157061, 11 page(s).

Extended European Search Report Mailed on Jul. 14, 2025 for EP Application No. 25154220, 10 page(s).

Non-Final Rejection Mailed on Jul. 15, 2025 for U.S. Appl. No. 18/591,532, 10 page(s).

Notice of Allowance and Fees Due (PTOL-85) Mailed on Jul. 22, 2025 for U.S. Appl. No. 18/591,544, 7 page(s).

Non-Final Rejection Mailed on Jan. 12, 2026 for U.S. Appl. No. 18/591,532, 6 page(s).

Notice of Allowance and Fees Due (PTOL-85) Mailed on May 1, 2026 for U.S. Appl. No. 18/591,532, 6 page (s).

* cited by examiner

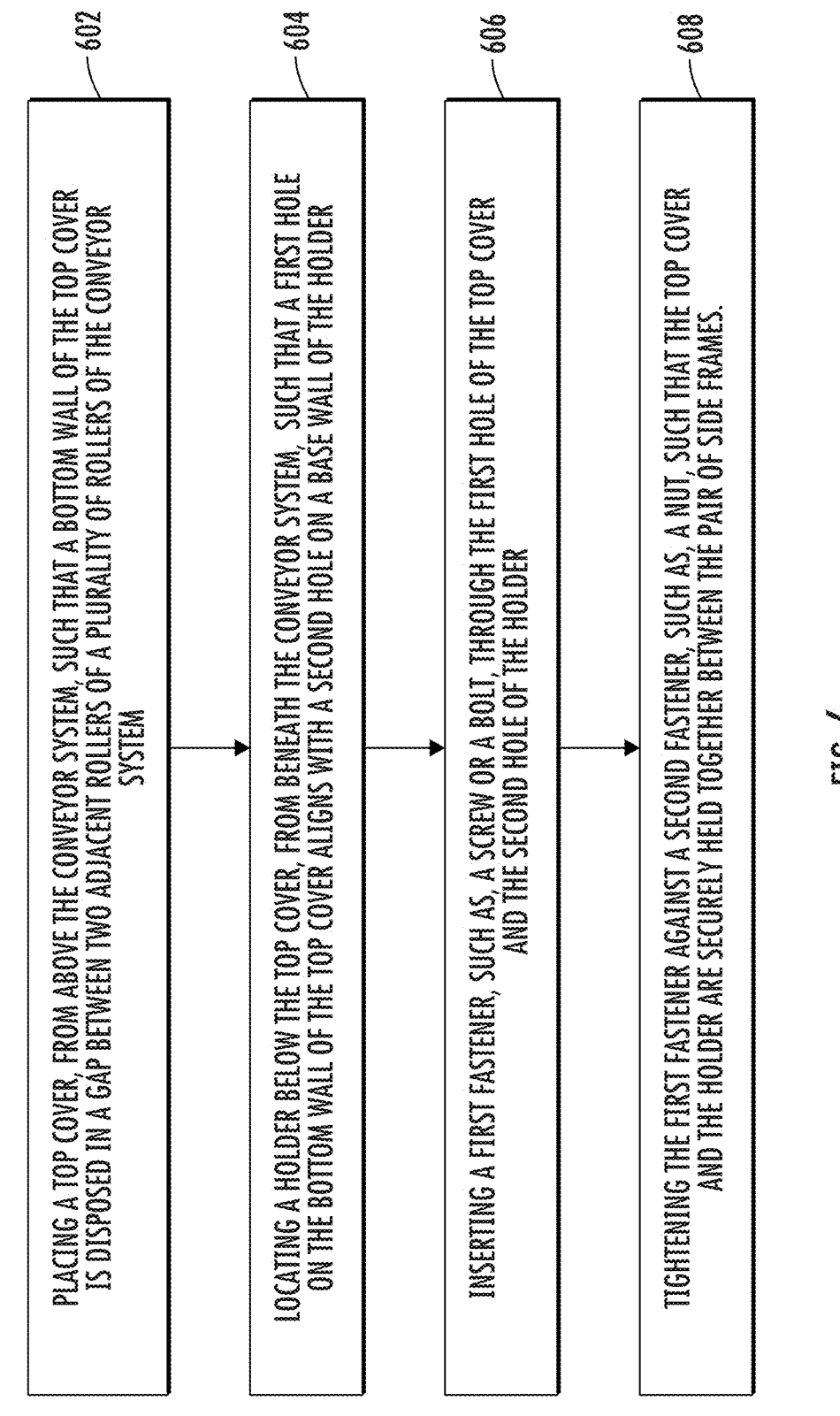

600

602 PLACING A TOP COVER, FROM ABOVE THE CONVEYOR SYSTEM, SUCH THAT A BOTTOM WALL OF THE TOP COVER IS DISPOSED IN A GAP BETWEEN TWO ADJACENT ROLLERS OF A PLURALITY OF ROLLERS OF THE CONVEYOR SYSTEM

604 LOCATING A HOLDER BELOW THE TOP COVER, FROM BENEATH THE CONVEYOR SYSTEM, SUCH THAT A FIRST HOLE ON THE BOTTOM WALL OF THE TOP COVER ALIGNS WITH A SECOND HOLE ON A BASE WALL OF THE HOLDER

606 INSERTING A FIRST FASTENER, SUCH AS, A SCREW OR A BOLT, THROUGH THE FIRST HOLE OF THE TOP COVER AND THE SECOND HOLE OF THE HOLDER

608 TIGHTENING THE FIRST FASTENER AGAINST A SECOND FASTENER, SUCH AS, A NUT, SUCH THAT THE TOP COVER AND THE HOLDER ARE SECURELY HELD TOGETHER BETWEEN THE PAIR OF SIDE FRAMES.

FIG. 6

GUARD ASSEMBLY FOR A CONVEYOR SYSTEM

FIELD OF THE INVENTION

Various embodiments described herein relate generally to a material handling system for handling objects and, more particularly, to apparatuses for use with a conveyor system configured to facilitate transportation of objects along a conveyor surface.

BACKGROUND

Generally, in material handling environments like, but not limited to, distribution centers, warehouses, inventories, or shipping centers, a material handling system can convey, handle, sort, and organize various type of articles (for example objects, cartons, cases, containers, shipment boxes, totes, packages, and/or the like) using one or more conveyor systems. Through applied effort, ingenuity, and innovation, many of these identified problems have been solved by developing solutions that are included in embodiments of the present disclosure, many examples of which are described in detail herein.

SUMMARY

Various embodiments are directed to a guard assembly for a conveyor system. In various embodiments, the conveyor system includes a plurality of rollers rotatably disposed between a pair of side frames of the conveyor system. In various embodiments, the guard assembly includes a top cover and a holder such that the top cover is disposed in a gap between two adjacent rollers of the plurality of rollers of the conveyor system; the holder is detachably coupled to the top cover; the holder is configured to secure the top cover between the two adjacent rollers of the conveyor system and the top cover defines a plurality of friction-reducing features proximal to at least one roller of the conveyor system.

In various embodiments, the friction-reducing features includes a plurality of recessed serrations. In various embodiments, the friction-reducing features includes a plurality of tapered grooves. In various embodiments, the friction-reducing features are equidistantly spaced-apart from each other.

In various embodiments, the holder includes a base wall with a first side and a second side; a first arm extending from the first side of the base wall and a second arm extending from the second side of the base wall such that the base wall is configured to support at least a portion of the top cover. In various embodiments, the holder includes at least one support rib extending between the first arm and the second arm. In various embodiments, the base wall includes a plurality of protrusions configured to prevent rotation of a fastener disposed therebetween.

Various embodiments are directed to a top cover for a guard assembly for conveyor system. In various embodiments, the conveyor system includes a plurality of rollers rotatably disposed between a pair of side frames of the conveyor system. In various embodiments, the top cover includes a bottom wall, a first sidewall and a second sidewall. In various embodiments, the bottom wall extends along a portion of a distance between the side frames of the conveyor system such that the bottom wall is in a gap between adjacent rollers of the plurality of rollers of the conveyor system. In various embodiments, the first sidewall and the second sidewall extend from bottom wall. In various embodiments, the first sidewall defines a plurality of friction-reducing features proximal to an adjacent roller of the conveyor system. In various embodiments, the second sidewall defines a plurality of friction-reducing features proximal to an adjacent roller of the conveyor system. In various embodiments, the friction-reducing features includes a plurality of recessed serrations. In various embodiments, the friction-reducing features includes a plurality of tapered grooves. In various embodiments, the friction-reducing features are equidistantly spaced-apart from each other.

In various embodiments, the first sidewall includes a first inclined wall and a first flange wherein the first inclined wall extends from the bottom wall and the first flange extends substantially horizontally from the first inclined wall.

In various embodiments, the second sidewall includes a second inclined wall and a second flange wherein the second inclined wall extends from the bottom wall and the second flange extends substantially horizontally from the second inclined wall.

In various embodiments, the bottom wall defines a receptacle configured to receive a head of a fastener therein. In various embodiments, the bottom wall defines a first hole configured to receive a shank of a fastener therein.

In various embodiments, the bottom wall defines at least one pre-cut groove extending across a width of the bottom wall. In various embodiments, the pre-cut groove is configured to shear off due to a bending load applied to the top cover.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Same numbers are used throughout the figures to reference like features and components. Embodiments incorporating teachings of the present disclosure are shown and described with respect to the figures presented herein, in which:

FIG. 6 illustrates a method of assembling a guard assembly on a conveyor system, according to an aspect of the present disclosure.

DETAILED DESCRIPTION

Figure 1:
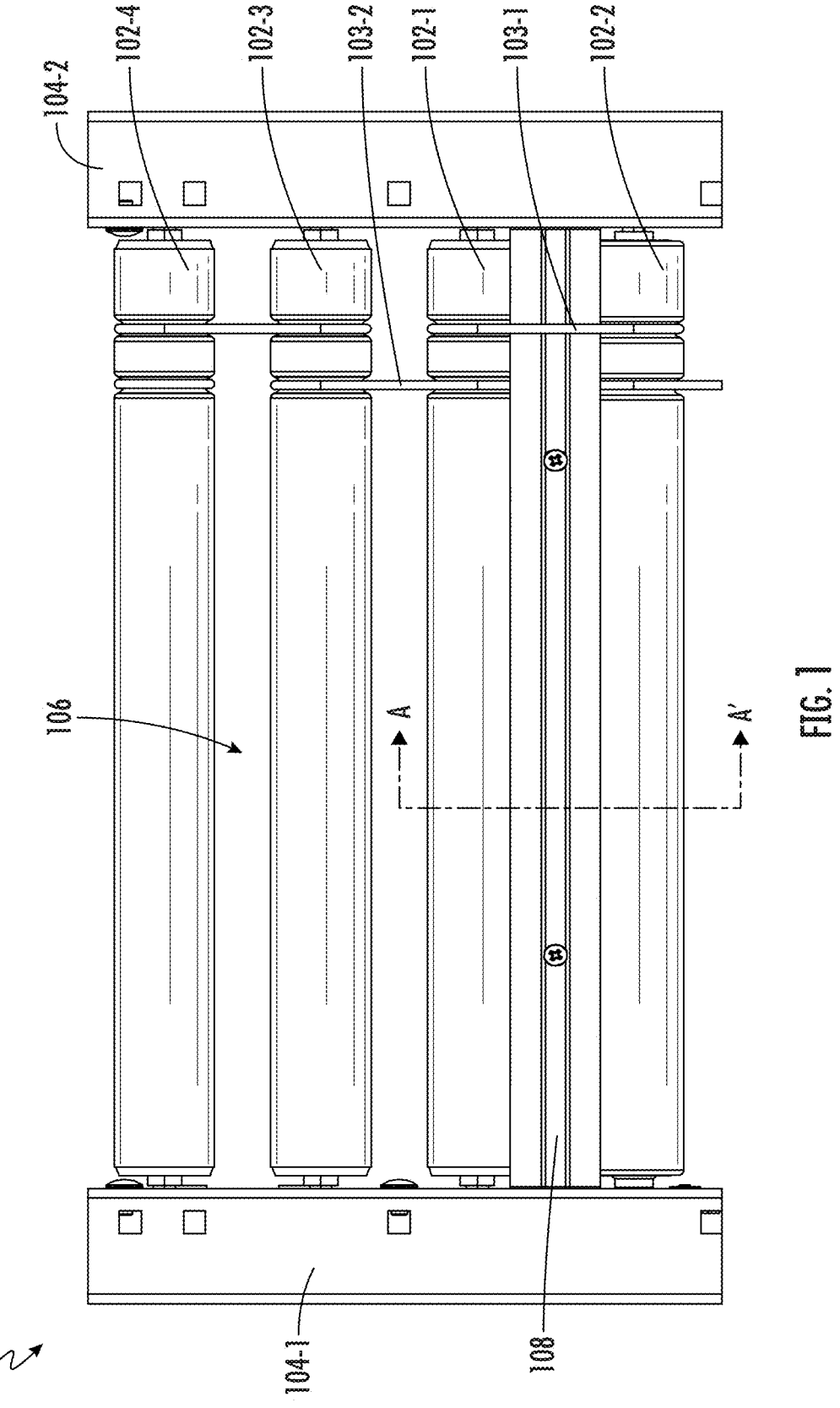
FIG. 1 illustrates a top view of a conveyor system, in accordance with various embodiments of the present disclosure.

Indeed, various embodiments may be embodied in many different forms and should not be construed as limited to the embodiments set forth herein. Other embodiments, and modifications and improvements of the described embodiments, will occur to those skilled in the art and all such other embodiments, modifications and improvements are within the scope of the present disclosure. Features from one embodiment or aspect may be combined with features from any other embodiment or aspect in any appropriate combination. For example, any individual or collective features of method aspects or embodiments may be applied to apparatus, product or component aspects or embodiments and vice versa. Like numbers refer to like elements throughout.

It should be understood at the outset that, although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations. The phrases "in an embodiment," "in some embodiments," "according to one embodiment," "in various embodiments" and the like generally mean that a particular feature, structure, or characteristic following the phrase may be included in at least one embodiment of the present disclosure or may be included in more than one embodiment of the present disclosure (importantly, such phrases do not necessarily refer to the same embodiment).

As used herein, directional terms used to describe a component, configuration, action, position, direction, and/or the like (for example, "rearward," "an upward vertical direction," "laterally outward," "bottom," "top," and the like) are meant to be interpreted relative to a hypothetical conveyor system provided on an at least substantially flat horizontal surface, but the terms are not to be interpreted as requiring the conveyor system to be in this orientation at any particular time.

If the specification states a component or feature "may," "can," "could," "should," "would," "preferably," "possibly," "typically," "optionally," "for example," "often," or "might" (or other such language) be included or have a characteristic, that specific component or feature is not required to be included or to have the characteristic. Such a component or feature may be optionally included in some embodiments, or it may be excluded.

Conveyor systems may be used in, for example, industrial manufacturing and packaging applications to facilitate the transportation of objects to a desired downstream location within a factory or a warehouse. For example, conveyor systems can include a plurality of cylindrical rollers disposed parallel and adjacent to each other along a length of the conveyor system. The plurality of rollers is arranged relative to one another such that the respective rolling surfaces of the rollers collectively define a conveyor path along which an object may be, at least, continuously transported towards the downstream location. Each roller can rotate about an axis thereof to help transfer objects disposed thereon to an adjacent roller and, in doing so, together, the plurality of cylindrical rollers supports in transferring the objects along a conveyor travel path towards an end of the conveyor system. Further, the conveyor systems include conveyor frame(s) having various structural components, such as, for example, but not limited to, sidewalls, panels, and/or the like, that are assembled relative to one another to define extremes capable of supporting the plurality of rollers therebetween.

In some examples, a guard apparatus may be installed within the conveyor system, by being secured relative to the side frames of the conveyor system, to prevent unauthorized and/or unintended access to an internal portion of the conveyor system, via a gap between any two adjacent rollers of the conveyor system. The guard apparatus may also prevent accumulation of debris, or small articles (such as fastener or coins) which may affect operation of the conveyor system. Further, the guard apparatus may also prevent accidental finger injury of an operator handling the objects on the conveyor system.

Additionally, the guard apparatus is subjected to repeated loading cycles, leading to localized deformations. Such deformations may cause a loosening of the guard apparatus installed within the conveyor system, which may result in undesirable movement thereof relative to the conveyor frame, undesirable noise (for example, rattling), partial inoperability of the guard apparatus, and/or unintentional disassembly of the guard apparatus relative to the conveyor system. Often, frictional force is developed between the rotating rollers and the conventional guard apparatus, resulting in reduced life and reliability thereof, undesirable loosening of the guard apparatus, and/or unintentional breakage of the guard apparatus. The conventional guard apparatus is known to include complicated profiles configured to address issues resulting from the development of the friction as mentioned herein. However, such complicated profiles of the guard apparatus increase design complexity besides an increase in cost of manufacturing.

Various embodiments of the present disclosure are directed to a guard assembly for a conveyor system. The conveyor system includes a plurality of rollers rotatably disposed between a pair of side frames of the conveyor system. In various embodiments, the guard assembly includes a top cover and a holder, such that the top cover is disposed in a gap between two adjacent rollers of the plurality of rollers of the conveyor system. The holder is detachably coupled to the top cover and configured to secure the top cover between the two adjacent rollers. The top cover defines a plurality of friction-reducing features located proximal to at least one roller of the conveyor system.

FIG. 1 illustrates a top view of a conveyor system 100, in accordance with various embodiments of the present disclosure. The conveyor system 100 includes a plurality of rollers 102 (such as a first roller 102-1, a second roller 102-2, a third roller 102-3, and a fourth roller 102-4), hereinafter alternatively, individually, and collectively referred to as "the roller(s) 102" or "adjacent rollers 102-1, 102-2", disposed between a pair of side frames 104-1, 104-2 (hereinafter alternatively and collectively referred to as "the side frames 104"), such that a gap 106 exists between any two adjacent rollers. For example, the gap 106 exists between two adjacent rollers 102-1, 102-2 or 102-3, 102-4. In various embodiments, the adjacent rollers are joined by one or more driving members 103-1 and 103-2 (collectively referred to as "the driving member 103"), such as a belt or an O-ring, at one end, where the driving member 103 is configured to transmit a rotary motion from one roller to the other, without slippage.

The conveyor system 100 may include multiple such driving members 103 configured to connect each pair of adjacent rollers to transmit the motion throughout a length of the conveyor system 100 in order to facilitate transfer of objects. As seen in FIG. 1, a guard assembly 108 is positioned within the conveyor system 100 to provide coverage over at least a portion of the gap 106 between the two adjacent rollers 102-1, 102-2. In some embodiments, the guard assembly 108 provides coverage over an entire portion of the gap 106 between the side frames 104-1 and 104-2.

Figure 2:
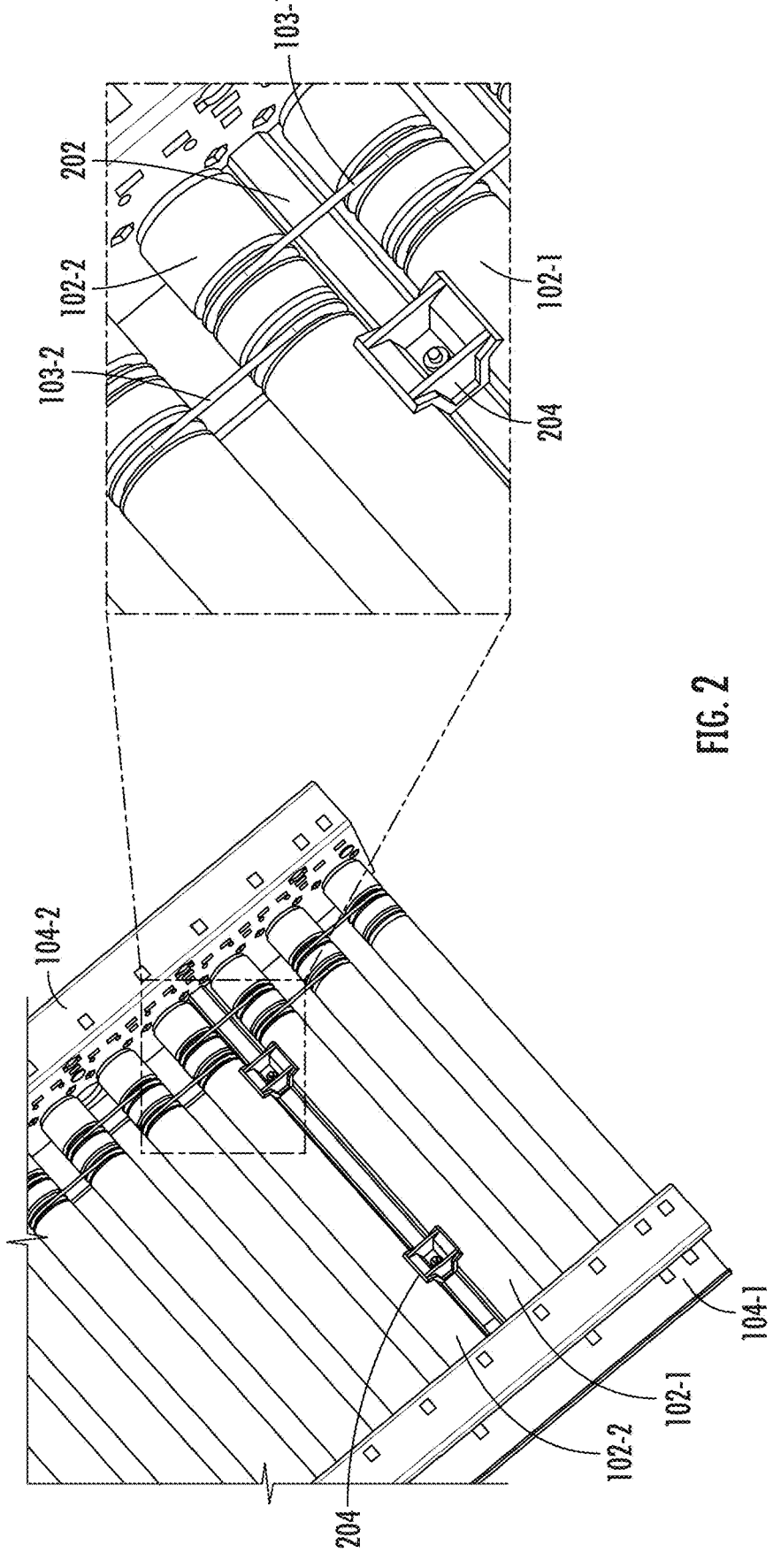
FIG. 2 illustrates a bottom perspective view of a portion of the conveyor system, in accordance with various embodiments of the present disclosure.

Referring to FIG. 2, a bottom perspective view of the conveyor system 100 is illustrated. FIG. 2 is described in conjunction with FIG. 1. The guard assembly 108 includes a top cover 202 and a holder 204. The top cover 202 is disposed in the gap 106 between the two adjacent rollers 102-1, 102-2 of the plurality of rollers 102. The holder 204 is detachably coupled to the top cover 202 and configured to secure the top cover 202 between the two adjacent rollers 102-1, 102-2. In various embodiments, the top cover 202 extends between the side frames 104-1, 104-2 and is configured to provide coverage over the entire portion of the gap 106 between the side frames 104-1, 104-2.

Figure 3A:
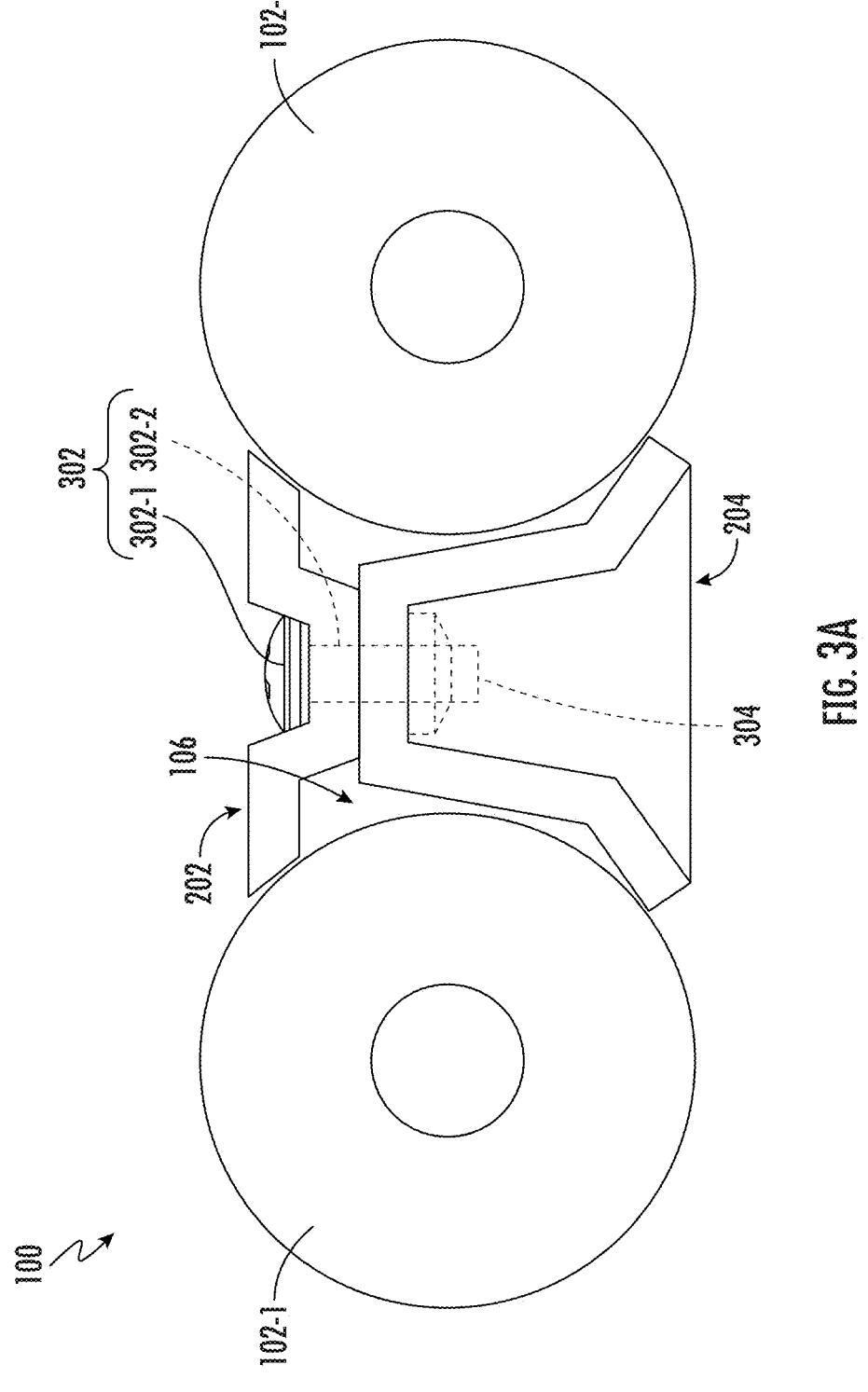
FIG. 3A illustrates a front view of a guard assembly and two adjacent rollers of the conveyor system, in accordance with various embodiments of the present disclosure.

Referring to FIG. 3A, a front view of the guard assembly 108 and two adjacent rollers 102-1, 102-2 of the conveyor system 100 is illustrated. FIG. 3A is described in conjunction with FIG. 1 and FIG. 2. The holder 204 is configured to detachably couple to the top cover 202 so as to secure the top cover 202 between the two adjacent rollers 102-1, 102-2. In some embodiments, a first fastener 302, such as a screw or a bolt, defining a shank 302-1 and a head 302-2 is used in combination with a second fastener 304, such as a nut, to secure the top cover 202 and the holder 204. In some embodiments, the top cover 202 is disposed below the driving member 103. As such, a top surface of the top cover 202 is located at a distance from the driving member 103.

Figure 3B:
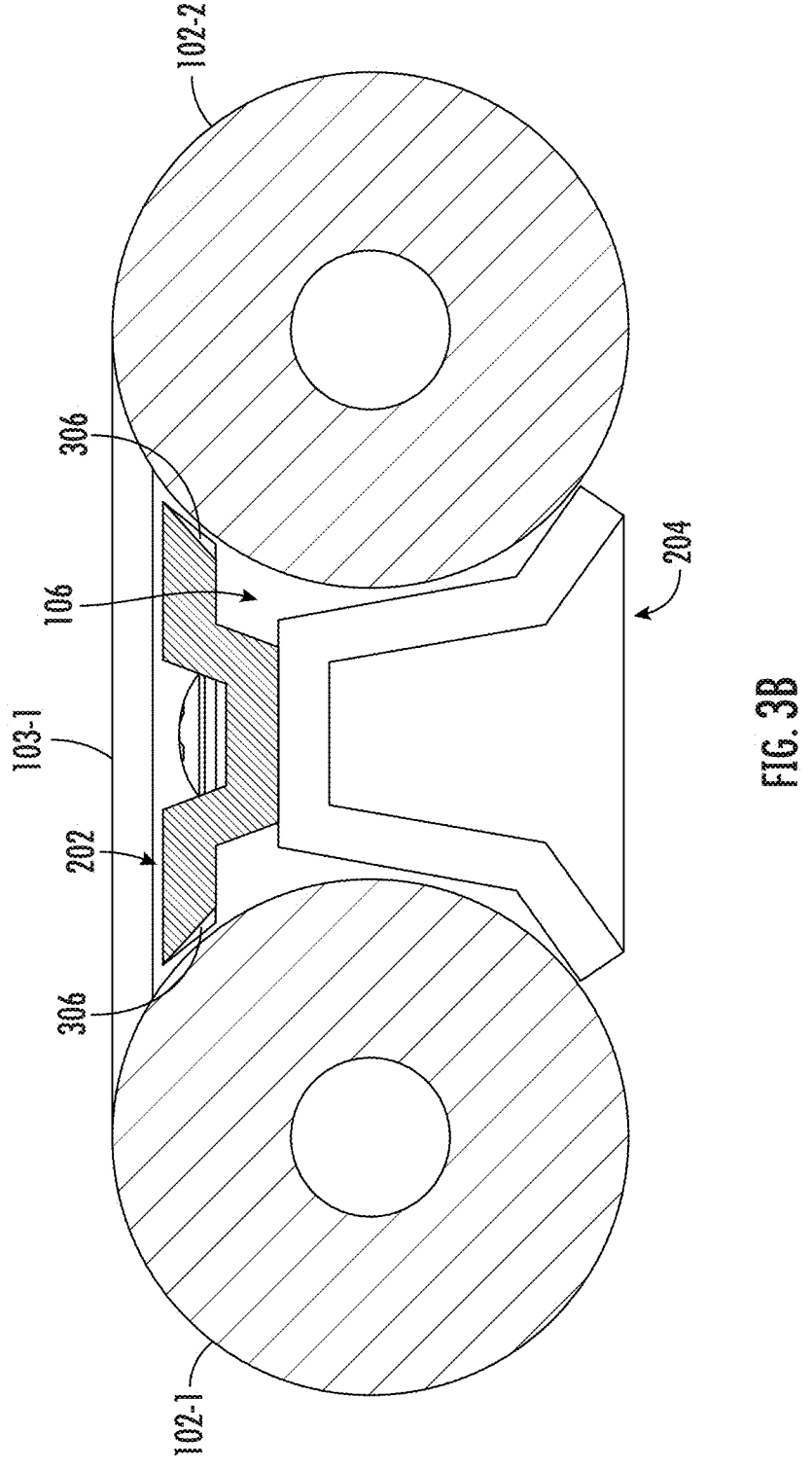
FIG. 3B illustrates a sectional view of the conveyor system taken along line A-A' of FIG. 1, in accordance with various embodiments of the present disclosure.

Referring to FIG. 3B, a cross-sectional view (taken along line A-A' of FIG. 1) of the guard assembly 108 disposed between the two adjacent rollers 102-1, 102-2 is illustrated. The top cover 202 defines a plurality of friction-reducing features 306 proximal to at least one roller (such as the roller 102-1) of the conveyor system 100. In various embodiments, the friction-reducing features 306 include a plurality of recessed serrations. In various embodiments, the friction-reducing features 306 include a plurality of tapered grooves. In various embodiments, the friction-reducing features 306 are equidistantly spaced-apart from each other. In cases where the top cover 202 and surface of the rollers 102-1, 102-2 abut during operation of the conveyor system 100, the friction-reducing features 306 aid in reducing the contact surface area of the top cover 202 with the rollers 102-1, 102-2, thereby reducing friction therebetween.

Figure 4A:
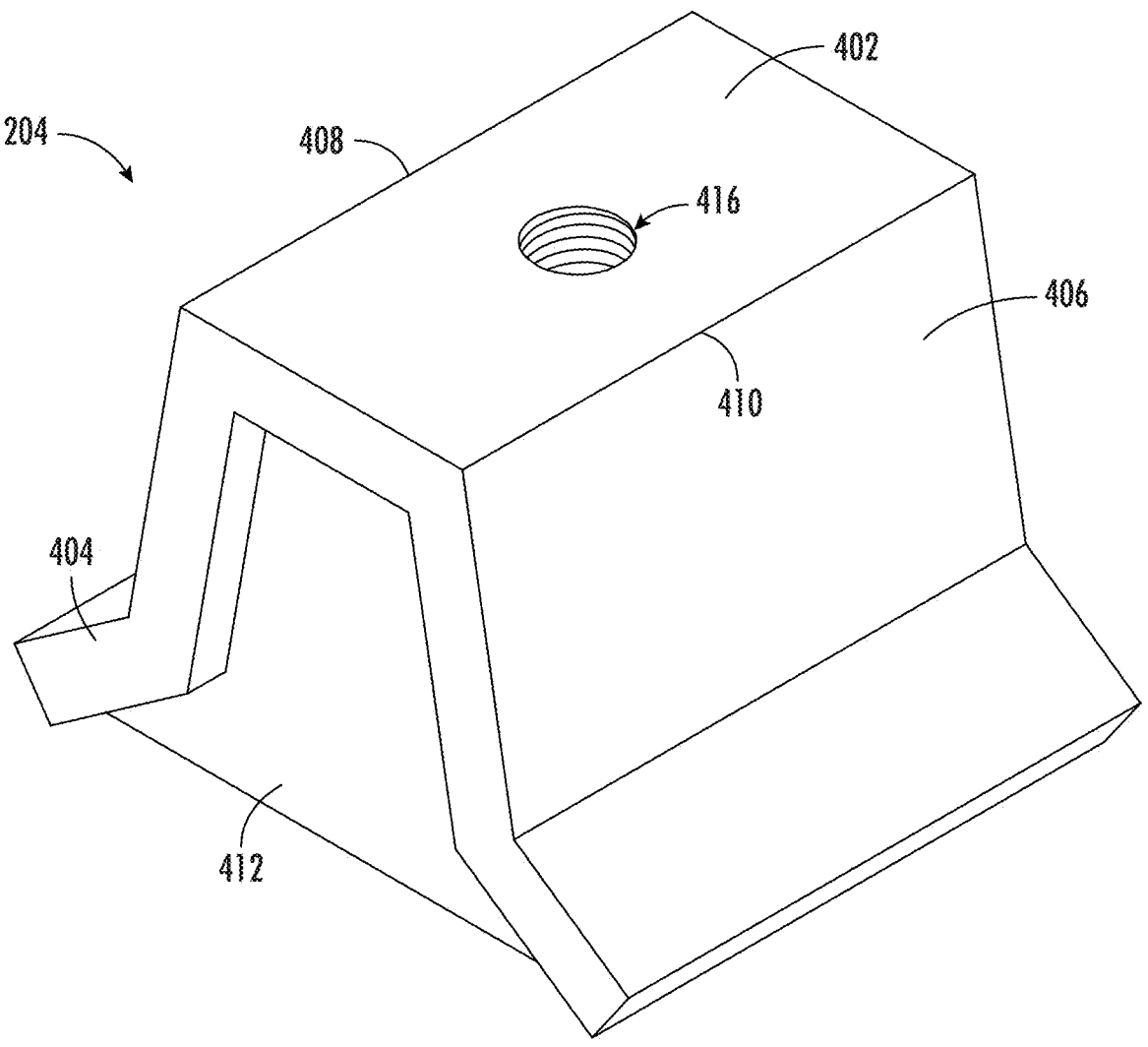
FIG. 4A illustrates a top perspective view of a holder of the guard assembly, in accordance with various embodiments of the present disclosure.

Referring to FIG. 4A, a top perspective view of the holder 204 is illustrated. The holder 204 includes a base wall 402, a first side 408, a second side 410, a first arm 404 extending from the first side 408 of the base wall 402, and a second arm 406 extending from the second side 410 of the base wall 402. The holder 204 further includes a support rib 412 extending between the first arm 404 and the second arm 406. In an installed condition of the guard assembly 108, the first arm 404 and the second arm 406 of the holder 204 are disposed proximal to the adjacent rollers 102-1 and 102-2, respectively. As used herein, the term "installed condition" refers to the conveyor system 100 including the guard assembly 108 disposed in the gap 106 between the adjacent rollers 102-1 and 102-2, as illustrated in FIG. 3A and FIG. 3B.

Figure 4B:
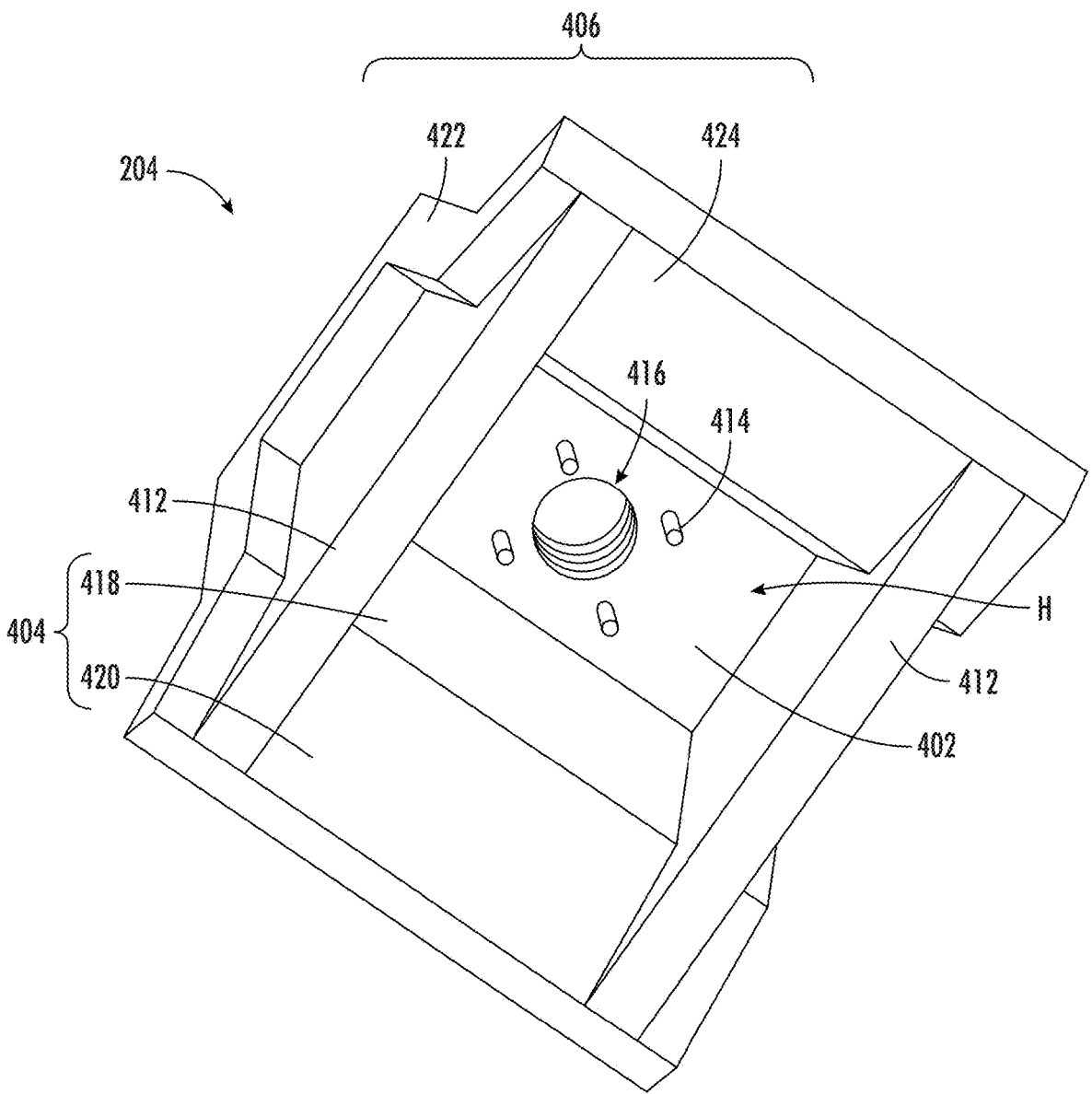
FIG. 4B illustrates a bottom perspective view of the holder of FIG. 4A, in accordance with various embodiments of the present disclosure.

Referring to FIG. 4B, a bottom perspective view of the holder 204 is illustrated. FIG. 4B is described in conjunction with FIG. 3A and FIG. 4A. The base wall 402 includes a plurality of protrusions 414 configured to prevent rotation of the second fastener 304 disposed therebetween. For example, the plurality of protrusions 414 engages, through an interference fit, with side surfaces (not shown) of the second fastener 304, such that the rotational motion of second fastener is restricted. Further, the base wall 402 defines a second hole 416 configured to receive the shank 302-2 of the first fastener 302 therethrough. In some embodiments, the first arm 404 of the holder 204 may include a first inclined portion 418 extending from the first side 408 of the base wall 402 and a second inclined portion 420 extending further divergently from the first inclined portion 418. Similarly, the second arm 406 of the holder 204 may include a third inclined portion 422 extending from the second side 410 of the base wall 402 and a fourth inclined portion 424 extending further divergently from the third inclined portion 422. In various embodiments, the second inclined portion 420 and the fourth inclined portion 424 are disposed proximal to the adjacent rollers 102-1 and 102-2, respectively.

In various embodiments, the holder 204 may be made of light-weight polymer, such as plastics, manufactured through, for example, injection molding. To this end, the support rib 412 and the plurality protrusions 414 may be integrally formed together with the base wall 402, the first arm 404 and the second arm 406. In various embodiments, the holder 204 defines a hollow space "H" surrounded by the first arm 404, the second arm 406 and one or more support ribs 412 joining the first arm 404 and the second arm 406. Shape of the illustrated holder 204 should not be construed as limited. Instead, other shapes and features will be apparent to a person skilled in the art, albeit with few changes to the features described and illustrated herein. For example, in some embodiments, the holder 204 may have a bell-shape. Further, the holder 204 may include multiple fillets, chamfer, or edge radii.

Figure 5A:
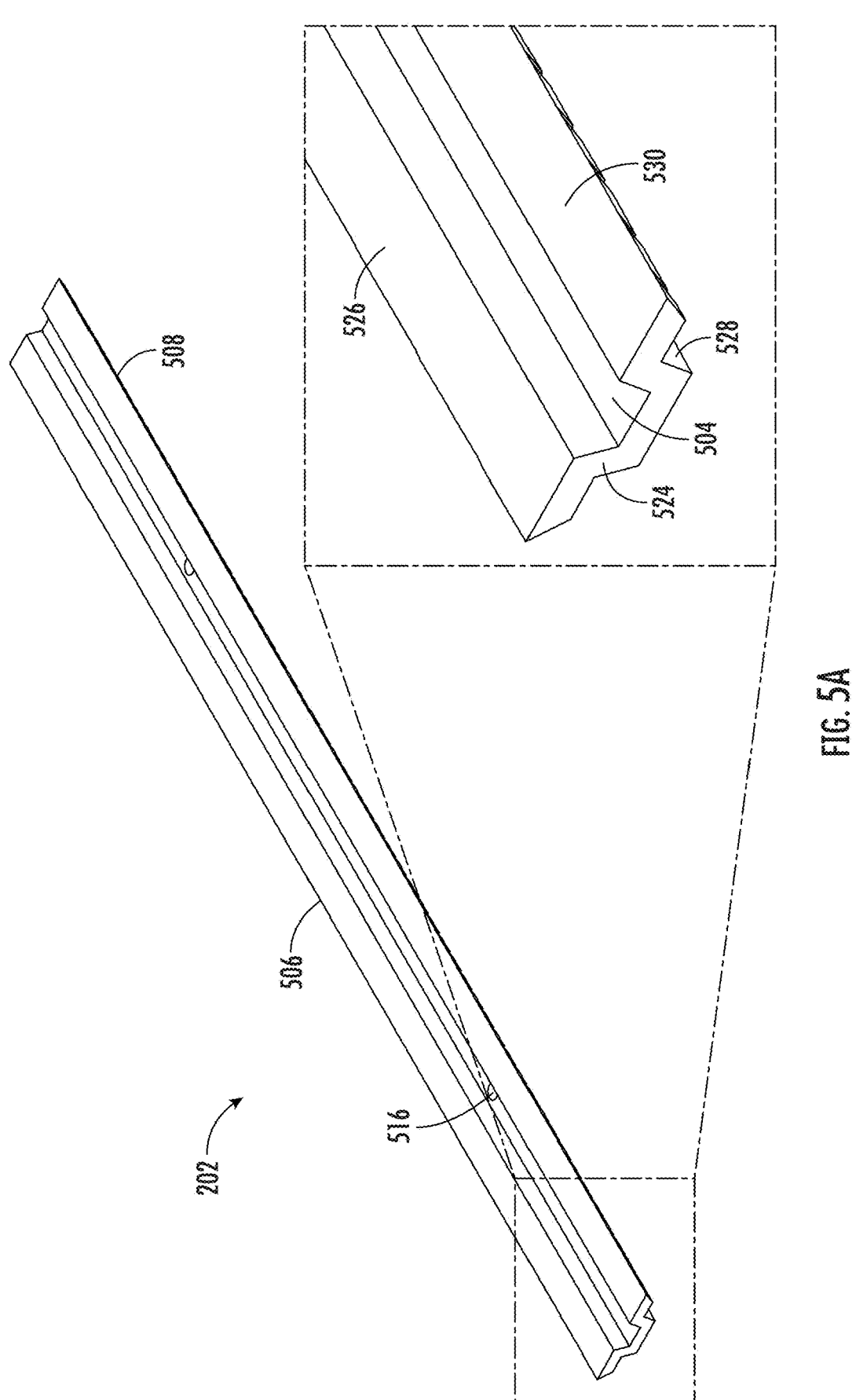
FIG. 5A illustrates a top perspective view of a top cover of the guard assembly, in accordance with various embodiments of the present disclosure.
Figure 5B:
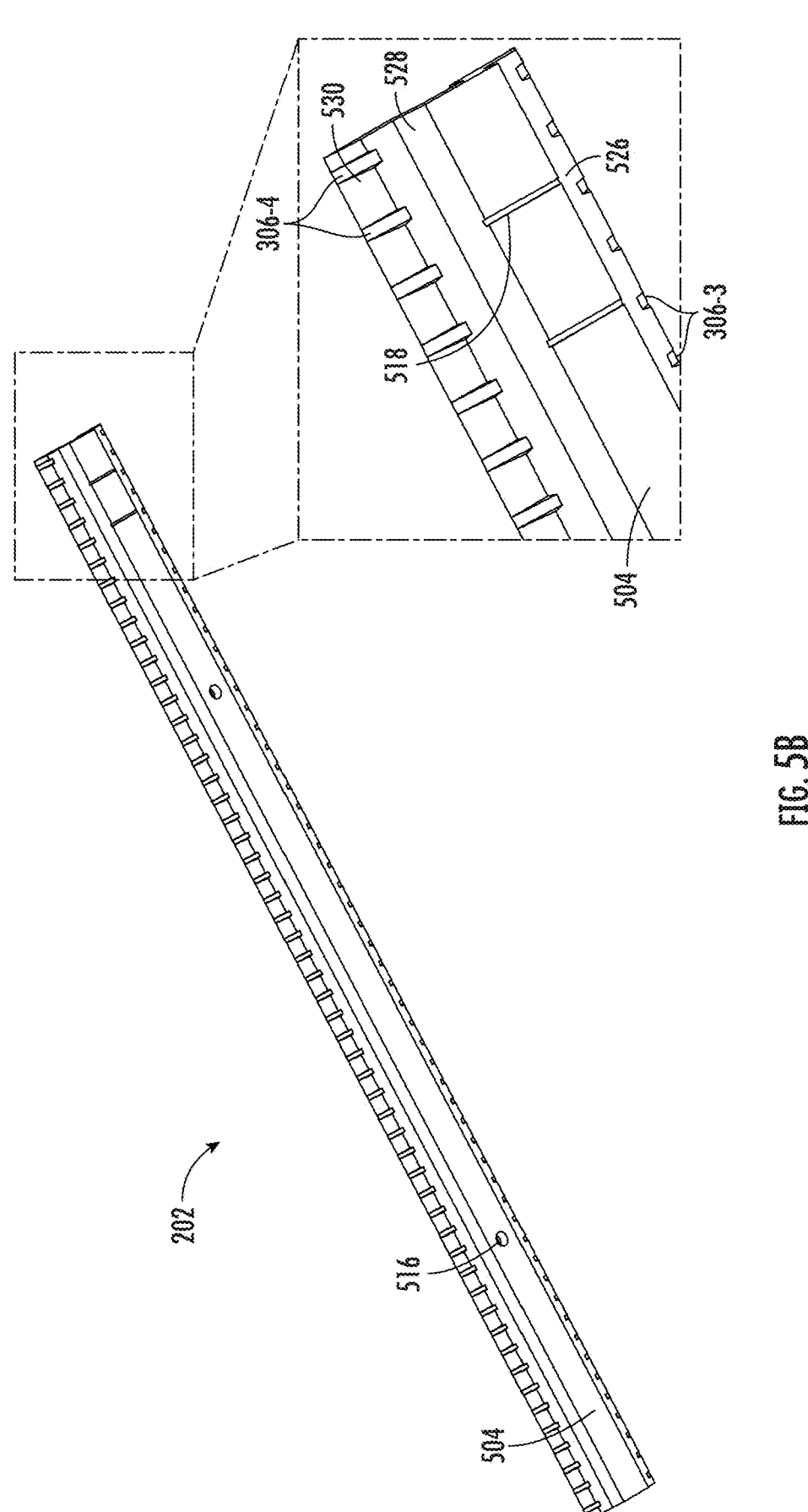
FIG. 5B illustrates a bottom perspective view of the top cover of FIG. 5A, in accordance with various embodiments of the present disclosure.

FIG. 5A illustrates a top perspective view of the top cover 202 and FIG. 5B illustrates a bottom perspective view of the top cover 202. FIG. 5A and FIG. 5B are described in conjunction with FIG. 3A. The top cover 202 includes a bottom wall 504, a first sidewall 506 located on one side of the bottom wall 504 and a second sidewall 508 located on an opposite side of the bottom wall 504. The bottom wall 504 extends along a portion of a distance between the side frames 104-1, 104-2 of the conveyor system 100. The bottom wall 504 is configured to be located in the gap 106 between adjacent rollers 102-1, 102-2 of the plurality of rollers 102. In various embodiments, the top cover 202 may be made up of light-weight polymer, such as plastics manufactured through, for example, injection molding. To this end, the bottom wall 504, the first sidewall 506 and the second sidewall 508 are integrally molded to form the top cover 202.

As shown in FIG. 5B, the top cover 202 defines the plurality of friction-reducing features 306 implemented as the plurality of recessed serrations. The bottom wall 504 may also define a receptacle configured to receive the head 302-1 of the first fastener 302 therein. The bottom wall 504 may define a first hole 516 configured to receive the shank 302-2 of the first fastener 302 therein.

Figure 5C:
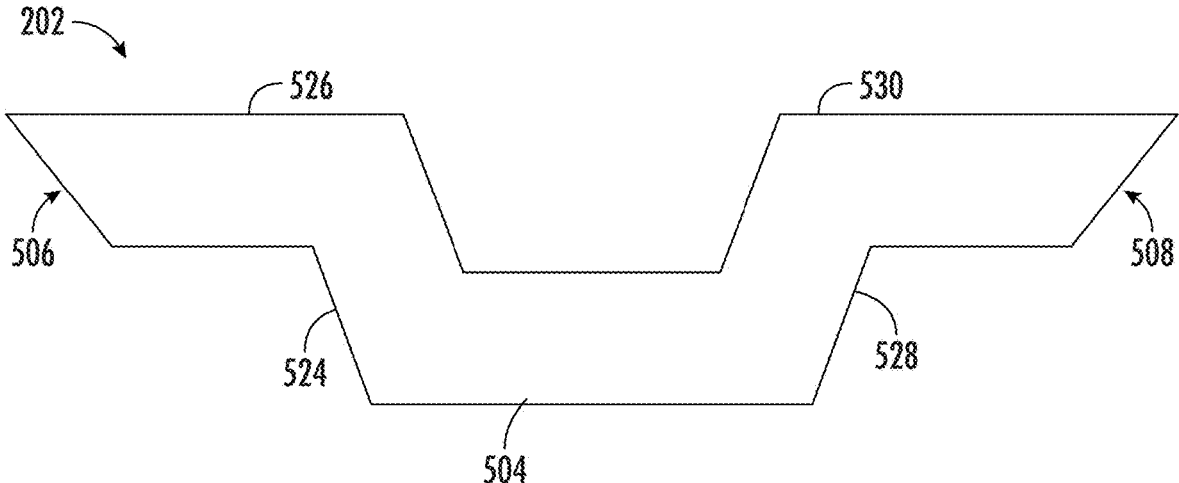
FIG. 5C illustrates a front view of the top cover of FIG. 5A, in accordance with various embodiments of the present disclosure.

FIG. 5C illustrates a front view of the top cover 202 of FIG. 5A. According to an embodiment, the first sidewall 506 and the second sidewall 508 extends from the bottom wall 504. The bottom wall 504 has a length "L" and a width "W", where the length "L" corresponds to the portion of the distance between the side frames 104-1, 104-2, and the width "W" corresponds to the gap 106 between adjacent rollers 102-1, 102-2 of the conveyor system 100. The bottom wall 504 may define at least one pre-cut groove 518 extending across the width "W" thereof, where the pre-cut groove 518 is configured to shear off due to a bending load applied to the top cover 202. In an event that a bending load is applied on the top cover 202, the pre-cut groove exhibits a higher stress concentration as compared to rest of the top cover. As the load is increased, there is an eventual shearing off of the top cover 202 into multiple intact components with desired and reduced length. In such a manner, the length of the top cover 202 may be adjusted by shearing off the top cover 202 at pre-determined locations to fit into conveyor systems with, for example, varying width between the side frames 104-1, 104-2. In various embodiments, the base wall 402 of the holder 204 is configured to support at least a portion of the top cover 202. For example, the bottom wall 504 of the top cover 202 abuts the base wall 402 of the holder 204 in the installed condition.

The first sidewall 506 of the top cover 202 includes a first inclined wall 524 extending from the bottom wall 504 and a first flange 526 extending substantially horizontally from the first inclined wall 524. The second sidewall 508 of the top cover 202 further includes a second inclined wall 528 extending from the bottom wall 504 and a second flange 530 extending substantially horizontally from the second inclined wall 528. The first flange 526 and the second flange 530 extend in opposite directions from the first inclined wall 524 and the second inclined wall 528 respectively. In various embodiments, the first inclined wall 524 and the second inclined wall 528 are disposed proximal to adjacent rollers 102-1, 102-2 of the plurality of rollers 102.

In some embodiments, the friction-reducing features 306 may be selectively provided on the first sidewall 506 and the second sidewall 508. For example, the first sidewall 506 may define a plurality of friction-reducing features 306-1 and the second sidewall 508 may define a plurality of friction-reducing features 306-2. In some embodiments, the friction-reducing features 306 may be defined on one of the first side wall 506 or the second sidewalls 508. Specifically, the first flange 526 defines a plurality of friction-reducing features 306-3 proximal to an adjacent roller 102-1 of the conveyor system 100 and the second flange 530 defines a plurality of friction-reducing features 306-4 proximal to another adjacent roller 102-2 of the conveyor system 100.

Shape of the illustrated top cover 202 should not be construed as limited. Instead, other shapes and features will be apparent to the person skilled in the art, albeit with few changes to the features described and illustrated herein. For example, the top cover 202 may include a U-shaped elongated wall with extending side flanges. Further, the top cover 202 may include multiple fillets, chamfer, or edge radii.

The present disclosure provides an improved guard assembly for a conveyor system. The guard assembly 108 as per the present disclosure prevents unauthorized and/or unintended access to portion of conveyor system 100. This is achieved by, for example, the top cover 202 which provides coverage over the entire portion of the gap 106 between the side frames 104. The guard assembly 108 also prevents accumulation of debris, or small article, such as fasteners or coins, which may lead to jamming of the conveyor system 100. Further, the guard assembly 108 prevents finger injury by effectively, in a way, blocking the gap 106 between adjacent rollers 102-1, 102-2.

Various embodiments of the present disclosure provide further advantages. As the plurality of rollers 102 of the conveyor system 100 rotate in order to transport an object, the guard assembly 108 is configured to remain stationary. However, during the operation of the conveyor system 100, the top cover 202 may abut surface of the rollers 102. In such instances, the friction-reducing features 306 aid in reducing the contact surface area of the top cover 202 with the rollers 102-1, 102-2, thereby reducing friction therebetween.

Owing to the presence of the friction-reducing features 306, the reliability and durable life of the guard assembly 108 may be increased. Further, in an event where a pull force is applied to remove or dismantle the guard assembly 108 from the conveyor system 100 in a vertical direction with respect to the rollers 102, the first arm 404 and the second arm 406 of the holder 204 engage with the rollers 102 at their respective distal edges and prevent the guard assembly 108 from lifting or dislocation. Further, the protrusions 414 on the base wall 402 of the holder 204 prevent anti-rotation of the second fastener 304 disposed therein, thereby eliminating possibility of loosening out of the top cover 202 due to repeated loading cycles.

Advantageously, since the first inclined wall 524 of the first sidewall 506 and the second inclined wall 528 of the second sidewall 508 extend divergently from the bottom wall 504, bending strength and bending stiffness of the top cover 202 may be improved, thereby reducing localized deformations. The support rib 412 adds to the strength and the stiffness of the holder 204, thereby reducing localized deformations of the holder.

There are further technical advantages provided by the present disclosure. It may be desirable to manufacture the top cover 202 and the holder 204 using simpler methods, such as injection molding. The present disclosure provides a simplified structure for each of the top cover 202 and the holder 204 thereby reducing the manufacturing costs, etc.

There are still further advantages of the present disclosure. As per an embodiment, the length of the top cover 202 may be adjusted based on differing conveyor system dimensions owing to the pre-cut groove 518.

Various aspects of the present disclosure provide a method of assembling the guard assembly 108 on the conveyor system 100. FIG. 6 illustrates a method 600 of assembling the guard assembly 108 on the conveyor system 100. FIG. 6 is described in conjunction with FIG. 1 through FIG. 5C The method includes placing the top cover 202, from above the conveyor system 100, such that the bottom wall 504 of the top cover 202 is disposed in the gap 106 between two adjacent rollers 102-1, 102-2 of the plurality of rollers 102 of the conveyor system 100; locating the holder 204 below the top cover 202, from beneath the conveyor system 100, such that the first hole 516 on the bottom wall 504 of the top cover 202 aligns with the second hole 416 on the base wall 402 of the holder 204; inserting the first fastener 302, such as, a screw or a bolt, through the first hole 516 of the top cover 202 and the second hole 416 of the holder 204; tightening the first fastener 302 against the second fastener 304, such as a nut, so that the top cover 202 and the holder 204 are securely held together between the pair of side frames 104.

The foregoing method descriptions are provided merely as illustrative examples and are not intended to require or imply that the steps of the various embodiments must be performed in the order presented. As will be appreciated by one of skilled in the art, the order of steps in the foregoing embodiments may be performed in any order. Any reference to claim elements in the singular, for example, using the articles "a," "an" or "the" is not to be construed as limiting the element to the singular.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (for example, "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Many modifications and other embodiments of the present disclosure will be apparent to one skilled in the art to which the present disclosure pertain having the benefit of teachings presented in the foregoing descriptions and the associated drawings. Although the figures only show certain components of the system described herein, it is understood that various other components may be present. Therefore, it is to be understood that the present disclosure should not be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A guard assembly for a conveyor system comprising a plurality of rollers rotatably disposed between a pair of side frames thereof, the guard assembly comprising:
    a top cover disposed in a gap between two adjacent rollers of the plurality of rollers; and
    a holder detachably coupled to the top cover, wherein the holder is configured to secure the top cover between the two adjacent rollers of the conveyor system;
    wherein the top cover defines a plurality of friction-reducing features proximal to at least one roller of the conveyor system, wherein the plurality of friction-reducing features comprise at least one of a plurality of recessed serrations and a plurality of tapered grooves.

2. The guard assembly of claim 1, wherein the plurality of friction-reducing features are equidistantly spaced apart from each other.

3. The guard assembly of claim 1, wherein the holder comprises:
    a base wall;
    a first arm extending from a first side of the base wall; and
    a second arm extending from a second side of the base wall,
    wherein the base wall is configured to support at least a portion of the top cover.

4. The guard assembly of claim 3, wherein the holder comprises at least one support rib extending between the first arm and the second arm.

5. The guard assembly of claim 3, wherein the base wall comprises a plurality of protrusions configured to prevent rotation of a fastener disposed therebetween.

6. A top cover for a guard assembly for a conveyor system comprising a plurality of rollers rotatably disposed between a pair of side frames thereof, the top cover comprising:
    a bottom wall extending along a portion of a distance between the side frames of the conveyor system, wherein the bottom wall is located in a gap between adjacent rollers of the plurality of rollers;
    a first sidewall extending from the bottom wall; and
    a second sidewall extending from the bottom wall;
    wherein at least one of the first sidewall or the second sidewall defines a plurality of friction-reducing features proximal to an adjacent roller of the conveyor system, wherein the plurality of friction-reducing features comprise at least one of a plurality of recessed serrations and a plurality of tapered grooves.

7. The top cover of claim 6, wherein the plurality of friction- reducing features are equidistantly spaced apart from each other.

8. The top cover of claim 6, wherein the first sidewall further comprises:
    a first inclined wall extending from the bottom wall; and
    a first flange extending substantially horizontally from the first inclined wall.

9. The top cover of claim 6, wherein the second sidewall further comprises:
    a second inclined wall extending from the bottom wall; and
    a second flange extending substantially horizontally from the second inclined wall.

10. The top cover of claim 6, wherein the bottom wall defines at least one receptacle configured to receive a head of a fastener therein.

11. The top cover of claim 6, wherein the bottom wall defines a first hole configured to receive a shank of a fastener therein.

12. The top cover of claim 6, wherein the bottom wall defines at least one pre-cut groove extending across a width of the bottom wall, the at least one pre-cut groove configured to shear off due to a bending load applied to the top cover.

* * * * *